United States Patent
Lee et al.

(10) Patent No.: US 11,372,495 B2
(45) Date of Patent: Jun. 28, 2022

(54) TOUCH SENSING DEVICE AND ELECTRONIC DEVICE CAPABLE OF IDENTIFYING POSITIONS OF MULTIPLE TOUCHES

(71) Applicant: Samsung Electro-Mechanics Co., Ltd., Suwon-si (KR)

(72) Inventors: Joo Hyoung Lee, Suwon-si (KR); Joo Yul Ko, Suwon-si (KR); Woo Young Choi, Suwon-si (KR); Jung Chul Gong, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/941,617

(22) Filed: Jul. 29, 2020

(65) Prior Publication Data

US 2021/0124453 A1    Apr. 29, 2021

(30) Foreign Application Priority Data

Oct. 25, 2019   (KR) .................. 10-2019-0134071
Mar. 12, 2020   (KR) .................. 10-2020-0030935

(51) Int. Cl.
*G06F 3/041*    (2006.01)
*G06F 3/044*    (2006.01)

(52) U.S. Cl.
CPC ............ *G06F 3/0416* (2013.01); *G06F 3/044* (2013.01); *G06F 2203/04104* (2013.01)

(58) Field of Classification Search
CPC .............. G06F 3/0416; G06F 3/044; G06F 2203/04104; G06F 2203/04103;

(Continued)

(56) References Cited

U.S. PATENT DOCUMENTS 3,666,875 A * 5/1972 Ranzato ................. G10H 1/342
                                                              84/738
3,772,684 A * 11/1973 Scantlin ................. H04L 25/40
                                                              336/131

(Continued)

FOREIGN PATENT DOCUMENTS

EP      3 035 398 A1    6/2016
JP      2012-168747 A   9/2012

(Continued)

OTHER PUBLICATIONS

Korean Office Action dated Aug. 31, 2020 in counterpart Korean Patent Application No. 10-2020-0030935 (7 pages in English and 5 pages in Korean).

*Primary Examiner* — Amy Onyekaba
(74) *Attorney, Agent, or Firm* — NSIP Law

(57) ABSTRACT

A touch sensing device in an electronic device, the electronic device including a touch manipulation unit disposed in a housing of the electronic device, the touch manipulation unit including a first insulating member penetrating through the housing, the touch sensing device including a first sensor unit disposed on an internal surface of the first insulating member, and an oscillation circuit connected to the first sensor unit, the oscillation circuit being configured to generate a first oscillation signal having a first resonance frequency that varies in response to a touch capacitance generated in response to the first insulating member being touched, wherein the first sensor unit contacts the internal surface of the first insulating member, and does not contact the housing.

14 Claims, 9 Drawing Sheets

(58) Field of Classification Search
CPC .............. G06F 3/04166; G06F 3/0447; G06F 2203/04106; G06F 3/04144; G06F 3/0202; G06F 3/045; G06F 3/047
See application file for complete search history.

(56) References Cited

U.S. PATENT DOCUMENTS

| | | | | |
|---|---|---|---|---|
| 4,748,295 | A * | 5/1988 | Rogers | G06F 3/041 327/306 |
| 6,262,464 | B1 * | 7/2001 | Chan | H03H 9/2463 257/416 |
| 9,660,644 | B2 * | 5/2017 | Buttolo | H03K 17/955 |
| 10,444,892 | B2 * | 10/2019 | Portmann | G06F 3/044 |
| 2007/0001784 | A1 * | 1/2007 | Morita | H03H 9/2463 333/186 |
| 2007/0276550 | A1 * | 11/2007 | Desai | B60S 1/0825 701/1 |
| 2008/0013934 | A1 * | 1/2008 | Uenaka | H04N 5/23248 348/208.11 |
| 2011/0234240 | A1 * | 9/2011 | Yager | A61B 5/4875 324/634 |
| 2012/0188022 | A1 * | 7/2012 | Nylen | H03B 5/1847 331/34 |
| 2013/0057501 | A1 * | 3/2013 | Nagata | G06F 3/0443 345/173 |
| 2013/0307818 | A1 * | 11/2013 | Pope | G06V 40/1353 345/174 |
| 2014/0043283 | A1 * | 2/2014 | Kim | G06F 3/04166 345/174 |
| 2014/0354604 | A1 * | 12/2014 | Huang | G06F 3/03545 345/179 |
| 2015/0123940 | A1 * | 5/2015 | Park | G06F 3/0445 345/174 |
| 2015/0130649 | A1 * | 5/2015 | Itakura | H03M 1/1295 341/157 |
| 2015/0193047 | A1 * | 7/2015 | Hoshtanar | G06F 3/0443 345/174 |
| 2015/0323695 | A1 * | 11/2015 | Stauber | G01V 3/12 324/239 |
| 2016/0285464 | A1 * | 9/2016 | Obata | H03B 5/36 |
| 2017/0016255 | A1 * | 1/2017 | Guibbert | B60R 25/01 |
| 2017/0090599 | A1 * | 3/2017 | Kuboyama | G06F 3/03547 |
| 2017/0269754 | A1 * | 9/2017 | Liu | H03K 17/962 |
| 2017/0285775 | A1 * | 10/2017 | Park | G06F 3/03545 |
| 2018/0018054 | A1 * | 1/2018 | Kimura | G06F 3/0412 |
| 2018/0089492 | A1 * | 3/2018 | Cai | G06F 3/0488 |
| 2018/0093695 | A1 * | 4/2018 | Hattori | B62D 1/046 |
| 2018/0120364 | A1 | 5/2018 | Lee et al. | |
| 2018/0139323 | A1 * | 5/2018 | Kim | H04M 1/72466 |
| 2018/0209937 | A1 * | 7/2018 | Iizuka | H01L 23/3185 |
| 2019/0027807 | A1 * | 1/2019 | Choi | H05K 5/03 |
| 2019/0041348 | A1 * | 2/2019 | Ashida | G01R 27/2623 |
| 2019/0173988 | A1 * | 6/2019 | Lee | H04M 1/18 |
| 2020/0373923 | A1 * | 11/2020 | Walsh | G01V 3/102 |
| 2020/0400513 | A1 * | 12/2020 | Jung | H03K 17/9618 |
| 2021/0019009 | A1 * | 1/2021 | Jung | G06F 3/046 |
| 2022/0035501 | A1 * | 2/2022 | Kobori | G06F 3/0441 |
| 2022/0050534 | A1 * | 2/2022 | Van Hooft | G06F 3/03547 |

FOREIGN PATENT DOCUMENTS

| | | |
|---|---|---|
| JP | 2015-95865 A | 5/2015 |
| KR | 2002-0077836 A | 10/2002 |
| KR | 10-2009-0002648 A | 1/2009 |
| KR | 10-2009-0120709 A | 11/2009 |
| KR | 10-2011-0087004 A | 8/2011 |
| KR | 10-2011-0087014 A | 8/2011 |
| KR | 10-2013-0061602 A | 6/2013 |
| KR | 10-2016-0071367 A | 6/2016 |
| KR | 10-2016-0143029 A | 12/2016 |
| KR | 10-2018-0046833 A | 5/2018 |

* cited by examiner

TOUCH SENSING DEVICE AND ELECTRONIC DEVICE CAPABLE OF IDENTIFYING POSITIONS OF MULTIPLE TOUCHES

CROSS-REFERENCE TO RELATED APPLICATIONS

This application claims the benefit under 35 USC 119(a) of Korean Patent Application Nos. 10-2019-0134071 filed on Oct. 25, 2019, and 10-2020-0030935 filed on Mar. 12, 2020, in the Korean Intellectual Property Office, the entire disclosures of which are incorporated herein by reference for all purposes.

BACKGROUND

1. Field

This application relates to a touch sensing device and an electronic device capable of identifying positions of multiple touches.

2. Description of Related Art

In general, wearable devices are preferred to have a thinner, simpler, and cleaner design, and accordingly existing mechanical switches in wearable devices are disappearing. This is possible with the implementation of dustproof and waterproof technology, as well as the development of an integrated model with a smooth surface design.

Currently, technologies such as touch on metal (ToM) technology in which metal is touched, capacitor sensing technology using a touch panel, microelectromechanical systems (MEMS), and micro strain gauges are being developed. Furthermore, a force touch function is also being developed.

In the case of an existing mechanical switch, a large size and space are required internally to implement the switch function, and there is a disadvantage that the external appearance of the case is not neat due to the switch protruding to the outside of the case or the structure of the switch not being integrated with the case and the relatively large space that is required.

In addition, there is a risk of electric shock due to direct contact with a mechanical switch that is connected to an electrical circuit, and in particular, there is a disadvantage that it is difficult to implement a waterproof and dustproof mechanical switch.

In addition, in the existing switch device having a touch switch unit that replaces a mechanical switch, it is difficult to distinguish positions of multiple touches.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a touch sensing device is in an electronic device, the electronic device including a touch manipulation unit disposed in a housing of the electronic device, the touch manipulation unit including a first insulating member penetrating through the housing, the touch sensing device including a first sensor unit disposed on an internal surface of the first insulating member; and an oscillation circuit connected to the first sensor unit, the oscillation circuit being configured to generate a first oscillation signal having a first resonance frequency that varies in response to a touch capacitance generated in response to the first insulating member being touched, wherein the first sensor unit contacts the internal surface of the first insulating member, and does not contact the housing.

The touch sensing device may further include a touch detection circuit configured to detect a touch of the first insulating member based on the first oscillation signal generated by the oscillation circuit.

The first insulating member may include an inner extension portion extending between an internal surface of the housing and the first sensor unit, and the first sensor unit may be separated from the internal surface of the housing by the inner extension portion of the first insulating member.

The first sensor unit may include a first sensing inductor element connected to the first oscillation circuit.

The first sensor unit may include a first sensing electrode contacting the internal surface of the first insulating member; and a first sensing inductor element connected to the first sensing electrode and the oscillation circuit.

The touch sensing device may further include a first sponge disposed between the internal surface of the first insulating member and the first sensor unit.

The touch manipulation unit may further include a second insulating member penetrating through the housing, and the touch sensing device may further include a second sensor unit disposed on an internal surface of the second insulating member.

The touch sensing device may further include a third sensor unit spaced apart from an internal surface of the housing.

In another general aspect, an electronic device includes a housing; a touch manipulation unit disposed in the housing and including a first insulating member penetrating through the housing; a first sensor unit disposed on an internal surface of the first insulating member; an oscillation circuit connected to the first sensor unit, the oscillation circuit being configured to generate a first oscillation signal having a first resonance frequency that varies in response to a touch capacitance generated in response to the first insulating member being touched; and a touch detection circuit configured to detect a touch of the first insulating member based on the first oscillation signal generated by the oscillation circuit, wherein the first sensor unit contacts the internal surface of the first insulating member, and does not contact the housing.

The first insulating member may include an inner extension portion extending between an internal surface of the housing and the first sensor unit, and the first sensor unit may be separated from the internal surface of the housing by the inner extension portion of the first insulating member.

The electronic device may further include a conductor member embedded in the first insulating member.

The conductor member may be exposed on an external surface of the first insulating member.

The first sensor unit may include a first sensing inductor element connected to the oscillation circuit.

The first sensor unit may include a first sensing electrode contacting the internal surface of the first insulating member; and a first sensing inductor element connected to the first sensing electrode and the oscillation circuit.

The electronic device may further include a first sponge disposed between the internal surface of the first insulating member and the first sensor unit.

The touch manipulation unit may further include a second insulating member penetrating through the housing, and the electronic device may further include a second sensor unit disposed on an internal surface of the second insulating member.

The electronic device may further include a third sensor unit spaced apart from an internal surface of the housing.

In another general aspect, a touch sensing device is in an electronic device, the electronic device including a housing, and a first touch member penetrating through the housing and being made of a material different from a material of which the housing is made, the touch sensing device including a first sensor unit contacting an internal surface of the first touch member and being separated from the housing; and a first oscillation circuit connected to the first sensor unit and configured to generate a first oscillation signal having a first resonance frequency that changes in response to the first touch member being touched.

The housing may be made of a conductive material, the first touch member may be made of an insulating material, and the first touch member may separate the first sensor unit from the housing.

The first touch member may include a first conductor member embedded in the first touch member so that the first conductor member is separated from the housing by the touch member, and is either not exposed on an external surface of the first touch member and an internal surface of the first touch member, or is exposed on either one or both of the external surface of the touch member and the internal surface of the touch member.

The electronic device may further include a second touch member penetrating through the housing and being made of a material different from the material of which the housing is made, and the touch sensing device may further include a second sensor unit contacting an internal surface of the second touch member and being separated from the housing; and a second oscillation circuit connected to the second sensor unit and configured to generate a second oscillation signal having a second resonance frequency that changes in response to the second touch member being touched.

In another general aspect, an electronic device includes a housing; a first touch member penetrating through the housing and being made of a material different from a material of which the housing is made; a first sensor unit contacting an internal surface of the first touch member and being separated from the housing; a first oscillation circuit connected to the first sensor unit and configured to generate a first oscillation signal having a first resonance frequency that changes in response to the first touch member being touched; and a touch detection circuit configured to detect whether the first touch member has been touched based on the first oscillation signal.

The housing may be made of a conductive material, the first touch member may be made of an insulating material, and the first touch member may separate the first sensor unit from the housing.

The first touch member may include a first conductor member embedded in the first touch member so that the first conductor member is separated from the housing by the touch member, and is either not exposed on an external surface of the first touch member and an internal surface of the first touch member, or is exposed on either one or both of the external surface of the touch member and the internal surface of the touch member.

The electronic device may further include a second touch member penetrating through the housing and being made of a material different from the material of which the housing is made; a second sensor unit contacting an internal surface of the second touch member and being separated from the housing; and a second oscillation circuit connected to the second sensor unit and configured to generate a second oscillation signal having a second resonance frequency that changes in response to the second touch member being touched, wherein the touch detection circuit is further configured to detect whether the second touch member has been touched based on the second oscillation signal.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
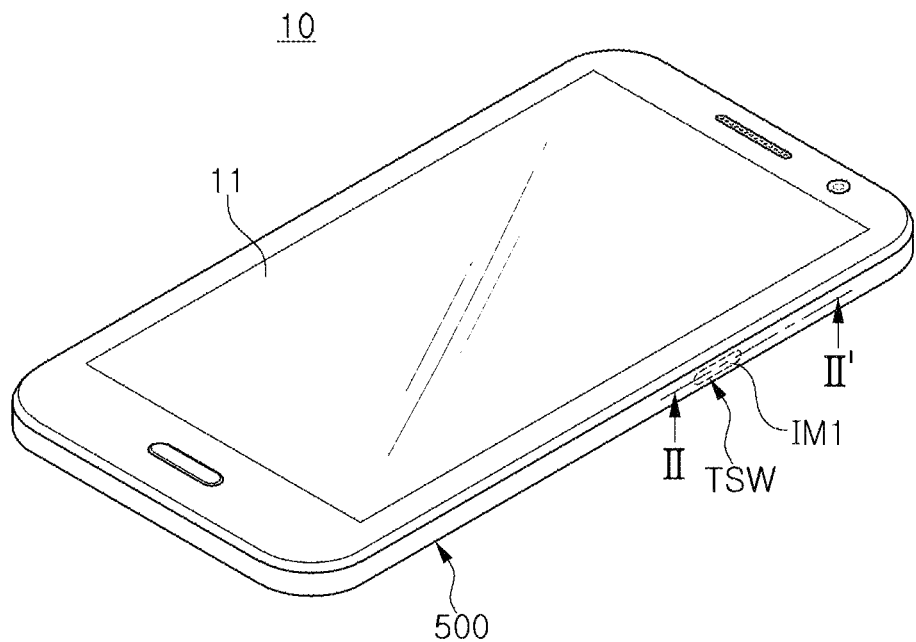
FIGS. 1A and 1B illustrate the exteriors of examples of an electronic device.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Use herein of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various elements, these elements are not to be limited by these terms. Rather, these terms are only used to distinguish one element from another element. Thus, a first element referred to in examples described herein may also be referred to as a second element without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 1B:
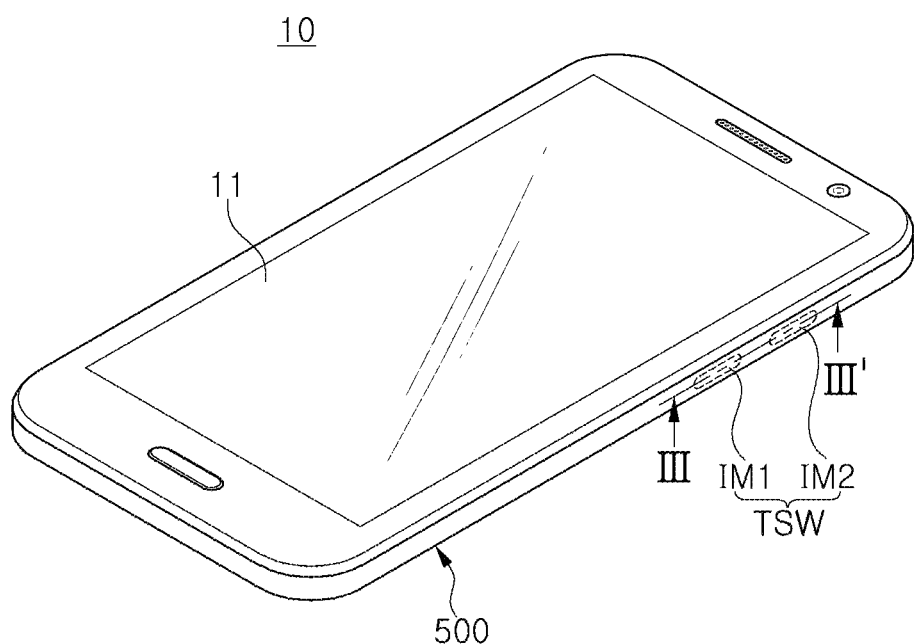

FIGS. 1A and 1B illustrate the exteriors of examples of an electronic device. FIG. 1A illustrates an exterior of an example of an electronic device including a first insulating member, and FIG. 1B illustrates an exterior of another example of an electronic device including a first insulating member and a second insulating member.

Referring to FIG. 1A, an electronic device 10 may include a touch screen 11, a housing 500, and a touch manipulation unit TSW including a first insulating member IM1, which replaces a mechanical button-type switch.

Referring to FIG. 1B, the electronic device 10 may include a touch screen 11, a housing 500, and a touch manipulation unit TSW including first and second insulating members IM1 and IM2, which replace mechanical button-type switches.

Although FIG. 1B illustrates the case in which the touch manipulation unit TSW includes the first and second insulating members IM1 and IM2 for convenience of description, the configuration is not limited to two insulating members, i.e., the first and second insulating members IM1 and IM2. For example, the number of insulating members may be increased to more than two insulating members.

The housing 500 may be made of a conductor such as a metal. For example, when the housing 500 is made of a conductor and a plurality of touch areas to be touched are disposed at a plurality of different positions, it may not be easy to identify respective positions of the plurality of touch areas. However, in the examples disclosed in this application, an insulating member is disposed in each touch area so that the touch area (or the touch position) may be easily identified.

For example, referring to FIGS. 1A and 1B, the electronic device 10 may be a portable device, such as a smartphone, or may be a wearable device, such as a smart watch, but is not limited to any specific device. For example, the electronic device 10 may be a portable or wearable electronic device, or any electronic device having a switch for operation control.

The housing 500 may be an outer case exposed to the outside of the electronic device. For example, when a touch sensing device is applied to a mobile device, the housing 500 may be a cover disposed on a side of the mobile device 10. For example, the housing 500 may be integrally formed with a cover disposed on the rear surface of the mobile device 10, or may be formed separately from a cover disposed on the rear surface of the mobile device 10.

As described above, the housing 500 may be an outer case of the electronic device 10, and is not particularly limited to a specific location, shape, or structure.

Referring to FIG. 1B, the first and second insulating members IM1 and IM2 may be disposed in the housing 500 of the electronic device 10, but the configuration is not limited thereto.

The first and second insulating members IM1 and IM2 may be disposed on the cover of the electronic device 10. In this case, the cover may be a cover excluding the touch screen, for example, a side cover, a rear cover, or a cover that may be formed on a portion of a front surface. Although for convenience of description, as an example of the housing, a case in which the first and second insulating members are disposed on a side cover of an electronic device is illustrated, the configuration is not limited thereto.

Figure 2:
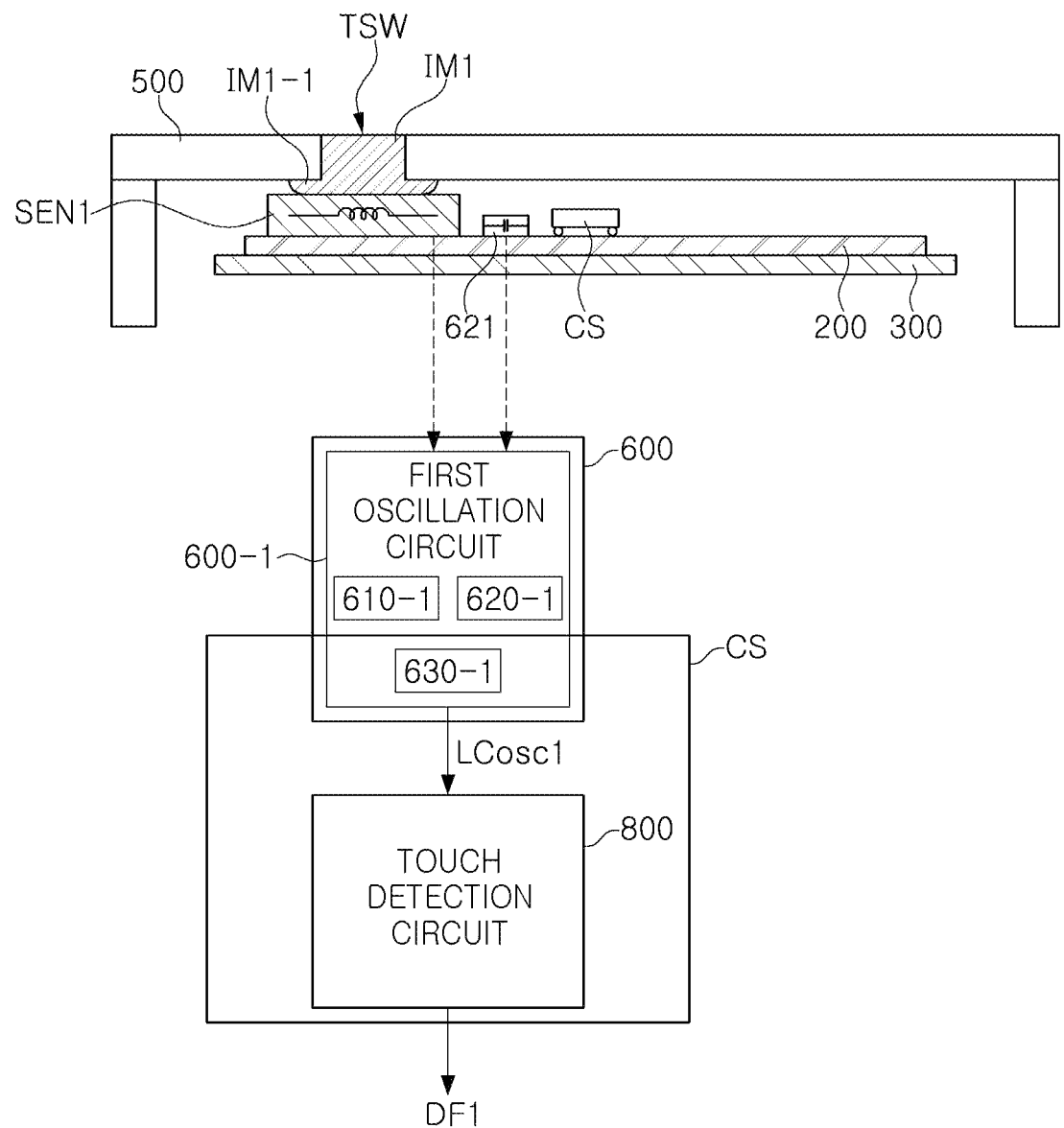
FIG. 2 illustrates a cross-sectional structure of an example of an electronic device taken along the line II-II' of FIG. 1A, and an example of a touch sensing device.

FIG. 2 illustrates a cross-sectional structure of an example of an electronic device taken along the line II-II' of FIG. 1A, and an example of a touch sensing device.

Referring to FIG. 2, the electronic device 10 may include the housing 500, the touch manipulation unit TSW, and a touch sensing device embedded in the electronic device 10.

The housing 500 may be a conductive outer case of the electronic device 10 made of a conductor as described above.

The touch manipulation unit TSW may include a first insulating member IM1 penetrating through the housing 500.

The touch sensing device may include a first sensor unit SEN1, an oscillation circuit 600, and a touch detection circuit 800.

The first sensor unit SEN1 may be disposed on an internal surface of the first insulating member IM1. For example, the first sensor unit SEN1 may contact the internal surface of the first insulating member IM1, and may not contact the housing 500.

The oscillation circuit 600 may include a first oscillation circuit 600-1. The first oscillation circuit 600-1 is connected to the first sensor unit SEN1. When the first insulating member IM1 is touched, a touch capacitance Ctouch (see FIG. 5) is generated, and a resonance frequency of the first oscillation circuit 600-1 varies according to the touch capacitance Ctouch. Thus, the oscillation circuit 600 may generate a first oscillation signal LCosc1 having the resonance frequency that varies according to the touch capacitance Ctouch.

The touch detection circuit 800 detects a touch of the first insulating member IM1 based on the first oscillation signal LCosc1 generated by the oscillation circuit 600, and generates a first touch detection signal DF1 indicating that the first insulating member IM1 has been touched.

For example, the first insulating member IM1 may include an inner extension portion IM1-1 extending between an internal surface of the housing 500 and the first sensor unit SEN1. The first sensor unit SEN1 may be separated from the internal surface of the housing 500 by the inner extension portion IM1-1 of the first insulating member IM1.

When describing the drawings of this application, unnecessary duplicate descriptions may be omitted for elements having the same reference numeral and the same function, and only differences in the drawings may be described.

Figure 3:
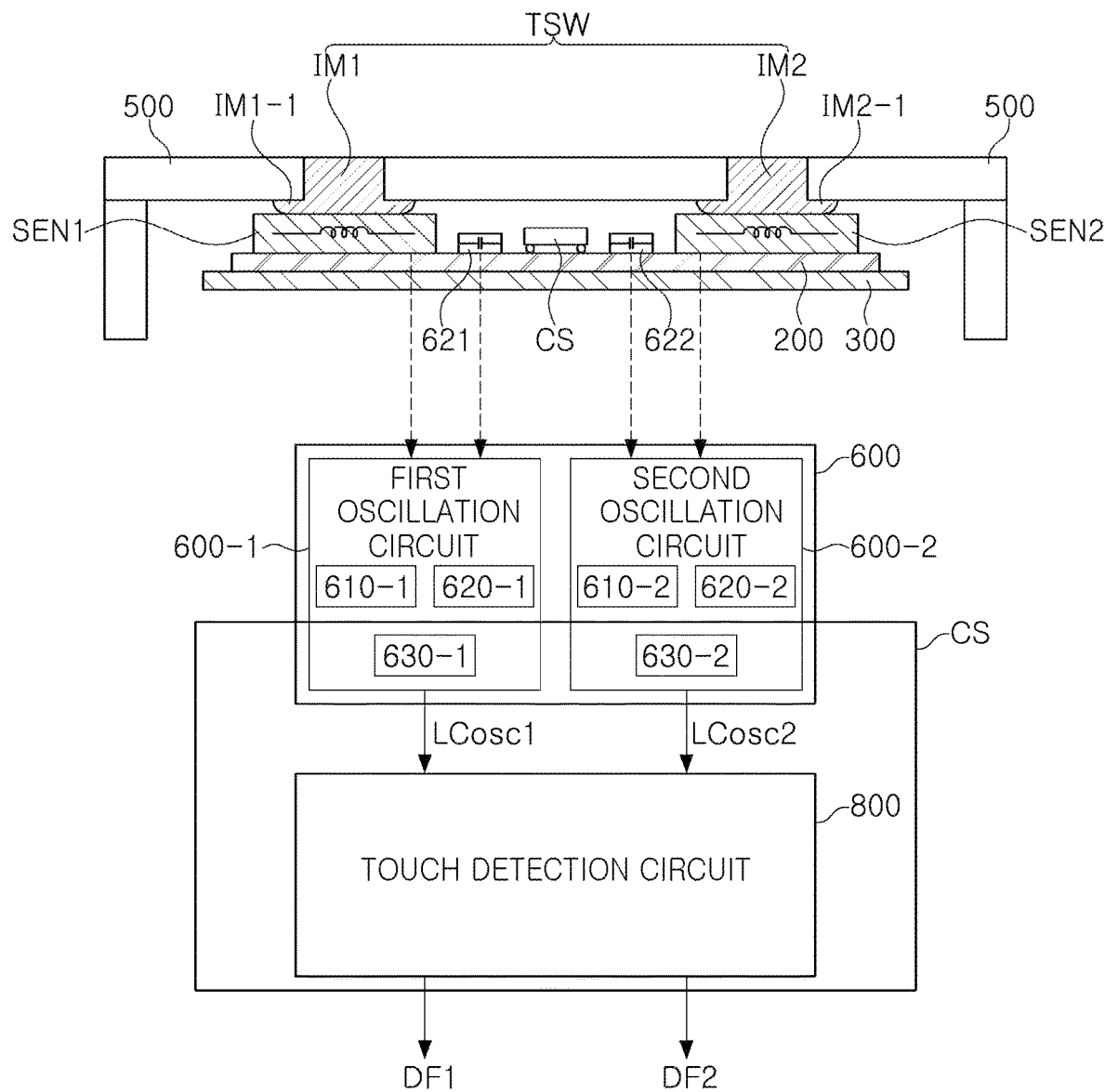
FIG. 3 illustrates a cross-sectional structure of another example of an electronic device taken along the line III-III' of FIG. 1B, and another example of a touch sensing device.

FIG. 3 illustrates a cross-sectional structure of another example of an electronic device taken along the line III-III' of FIG. 1B, and another example of a touch sensing device.

Referring to FIG. 3, an electronic device 10 may include a housing 500, a touch manipulation unit TSW, and a touch sensing device.

The housing 500 may be a conductive outer case of the electronic device 10 made of a conductor as described above.

The touch sensing device may include a first sensor unit SEN1, a second sensor unit SEN2, an oscillation circuit 600, and a touch detection circuit 800.

The touch manipulation unit TSW may include first and second insulating members IM1 and IM2 penetrating through the housing 500.

The first sensor unit SEN1 may be disposed on an internal surface of the first insulating member IM1. For example, the first sensor unit SEN1 may contact the internal surface of the first insulating member IM1, and may not contact the housing 500.

The second sensor unit SEN2 may be disposed on an internal surface of the second insulating member IM2. For example, the second sensor unit SEN2 may contact the internal surface of the second insulating member IM2, and may not contact the housing 500.

The oscillation circuit 600 may include a first oscillation circuit 600-1 and a second oscillation circuit 600-2.

The first oscillation circuit 600-1 is connected to the first sensor unit SEN1. When the first insulating member IM1 is touched, a touch capacitance Ctouch (see FIG. 5) is generated, and a resonance frequency of the first oscillation circuit 600-1 varies depending on the touch capacitance Ctouch. Thus, the first oscillation circuit 600-1 may generate a first oscillation signal LCosc1 having the resonance frequency that varies according to the touch capacitance Ctouch.

Figure 5:
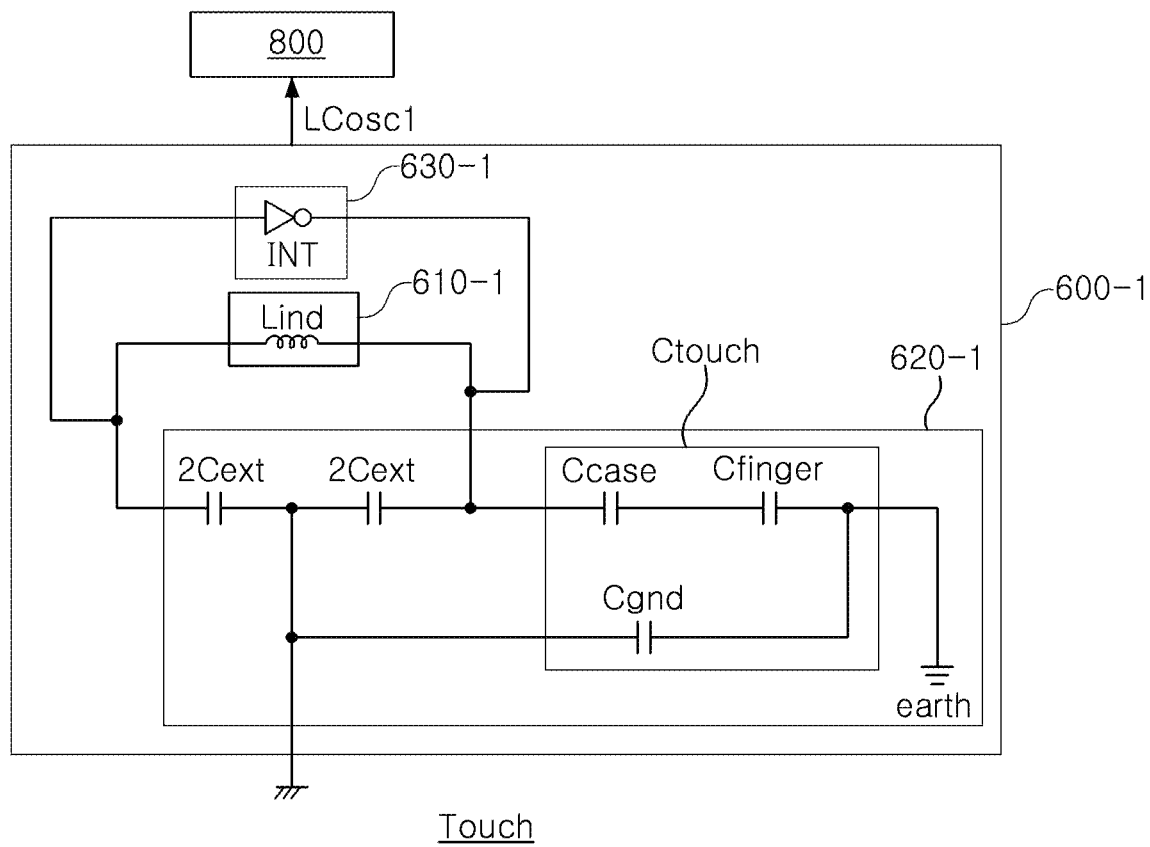
FIG. 5 illustrates an example of an oscillation circuit when an insulating member of a touch manipulation unit is touched.

In addition, the second oscillation circuit 600-2 is connected to the second sensor unit SEN2. When the second insulating member IM2 is touched, a touch capacitance like the touch capacitance Ctouch in FIG. 5 is generated, and a resonance frequency of the second oscillation circuit 600-2 varies depending on the touch capacitance. Thus, the second oscillation circuit 600-2 may generate a second oscillation signal LCosc2 having the resonance frequency that varies according to the touch capacitance.

The touch detection circuit 800 detects a touch of the first insulating member IM1 based on the first oscillation signal LCosc1 generated by the oscillation circuit 600, and generates a first touch detection signal DF1 indicating that the first insulating member IM1 has been touched. Also, the touch detection circuit 800 detects a touch of the second insulating member IM2 based on the second oscillation signal LCosc2 generated by the oscillation circuit 600, and generates a second touch detection signal DF2 indicating that the second insulating member IM2 has been touched.

For example, the first insulating member IM1 may include an inner extension portion IM1-1 extending between an internal surface of the housing 500 and the first sensor unit SEN1. The first sensor unit SEN1 may be separated from the internal surface of the housing 500 by the inner extension portion IM1-1 of the first insulating member IM1.

Also, the second insulating member IM2 may include an inner extension portion IM2-1 extending between the internal surface of the housing 500 and the second sensor unit SEN2. The second sensor unit SEN2 may be separated from the internal surface of the housing 500 by the inner extension portion IM2-1 of the second insulating member IM2.

In FIGS. 1 and 2, the first sensor unit SEN1 and the second sensor unit SEN2 may be mounted on a substrate 200, and the substrate 200 may be supported by a bracket 300. The bracket 300 may be made of an insulator, and may be mounted on an internal structure of the electronic device 10.

In addition, a circuit part CS, a first capacitor element 621, and a second capacitor element 622 may be mounted on the substrate 200. The substrate 200 may be a printed circuit board (PCB) or a flexible printed circuit board (FPCB), but is not limited thereto. For example, the substrate 200 may be a board (for example, any of various types of circuit boards such as a PCB or an FPCB) on which a circuit pattern may be formed, or may be a panel (for example, a panel for Panel Level Packaging (PLP)).

The first and second insulating members IM1 and IM2 are made of an insulating material, that is, a non-conductive material, so that they are electrically insulated from the conductive housing 500. For example, a material of the first and second insulating members IM1 and IM2 may be plastic, rubber, or an adhesive bond.

When a human finger touches the first insulating member IM1 (or the second insulating member IM2), the touch generates a parasitic capacitance that affects the first sensor unit SEN1 (or the second sensor unit SEN2) disposed on the internal surface of the insulating member IM1 (or the second insulating member IM2), and causes a change in resonance frequency of the oscillation circuit 600 connected to the first sensor unit SEN1 (or the second sensor unit SEN2).

Referring to FIGS. 1A to 3, the touch manipulation unit TSW may include one or more insulating members. The insulating members may have a structure in which a non-conductive material fills a hole in the housing 500 and protrudes outside the housing 500 to inform the user of a touch position. When a plurality of insulating members are provided as illustrated in FIGS. 1B and 3, a slide gesture in which a user slides his finger from one insulating member to another insulating member may be detected.

Since the first oscillation circuit 600-1 and the second oscillation circuit 600-2 have the same structure and operate on the same principle, the first oscillation circuit 600-1 will be described, and the description of the first oscillation circuit 600-1 will serve as a description of the second oscillation circuit 600-2.

Figure 4:
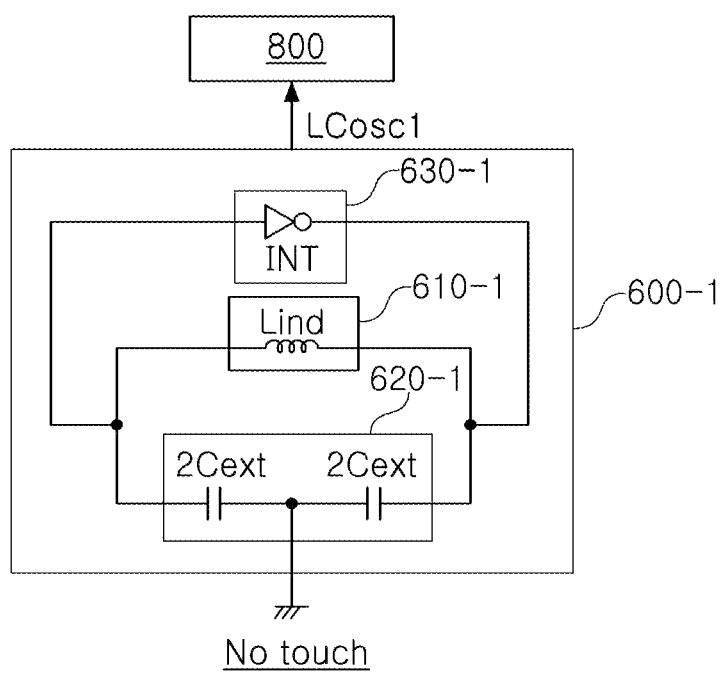
FIG. 4 illustrates an example of an oscillation circuit when an insulating member of a touch manipulation unit is not touched.

FIG. 4 illustrates an example of an oscillation circuit when an insulating member of a touch manipulation unit is not touched, and FIG. 5 illustrates an example of an oscillation circuit when an insulating member of a touch manipulation unit is touched.

Referring to FIGS. 4 and 5, the first oscillation circuit 600-1 includes a first inductance circuit 610-1, a first capacitance circuit 620-1, and a first amplification circuit 630-1.

The first inductance circuit 610-1 may include the first sensor unit SEN1 mounted on the substrate 200 and having an inductance Lind as an inductance of a resonance circuit of the first oscillation circuit 600-1. For example, the first sensor unit SEN1 may include a first inductor element having the inductance Lind.

The first capacitance circuit 620-1 may include a first capacitor element 621 mounted on the substrate 200 and having a capacitance Cext (represented by an equivalent capacitance of two capacitances 2Cext connected in series) as a capacitance of the resonance circuit of the first oscillation circuit 600-1.

The first amplification circuit 630-1 is connected to the first inductance circuit 610-1 and the first capacitance circuit 620-1 to generate a first oscillation signal LCosc1 having a resonance frequency determined by a resonance circuit formed by the first inductance circuit 610-1 and the first capacitance circuit 620-1.

Referring to FIG. 4, when the first insulating member IM1 is not touched by a finger, i.e., when there is no touch input, the capacitance Cext of the first capacitance circuit 620-1 may be represented by an equivalent capacitance in which two capacitances 2Cext are connected in series.

Referring to FIG. 5, when the first insulating member IM1 is touched by a finger, i.e., when there is a touch input, the first capacitance circuit 620-1 may further include a touch capacitance Ctouch generated by the finger touching the ins.

The touch capacitance Ctouch is connected in parallel with one capacitance 2Cext of the equivalent capacitance of the first capacitor element 621 in which two capacitances 2Cext are connected in series, and may include a plurality of capacitances (Ccase, Cfinger, and Cgnd) connected in series with each other.

Ccase may be a case (housing) capacitance between the housing 500 and the first sensor unit SEN1 having the inductance Lind, Cfinger may be a human finger capacitance, and Cgnd may be a ground capacitance between a circuit ground and earth.

Hereinafter, the resonance frequency of the first oscillation circuit 600-1 will be described.

First, referring to FIG. 4, when the first insulating member IM1 is not touched by a finger, i.e., when there is no touch input, the first oscillation circuit 600-1 may be a parallel oscillation circuit that includes the inductance Lind of the first sensor unit 611 included in the first inductance circuit 610-1 and the capacitance Cext of the first capacitor element 621 included in the first capacitance circuit 620-1 and represented by the equivalent capacitance in which two capacitances 2Cext are connected in series.

Thus, when the first insulating member IM1 is not touched by a finger, i.e., when there is no touch input, a first resonance frequency fres1 of the first oscillation circuit 600-1 may be expressed by Equation 1 below.

$$\text{fres1} \approx 1/\{2\pi \cdot \text{sqrt}(\text{Lind} \cdot \text{Cext})\} \quad (1)$$

In Equation 1, ≈ means the same or similar, and means that other values may be further included. In other words, there may be other parameters affecting the first resonant frequency fres1 that may be included in Equation 1.

Referring to FIG. 5, when the first insulating member IM1 is touched by a finger, i.e., when there is a touch input, the first capacitance circuit 620-1 further includes the touch capacitance Ctouch generated by the finger touching the first insulating member IM1, so a total capacitance of the first capacitance circuit 620-1 changes.

That is, the first oscillation circuit 600-1 may include the touch capacitance Ctouch (Ccase, Cfinger, Cgnd) generated when the finger touches the first insulating member IM1, as well as the two capacitances 2Cext connected in series of the equivalent capacitance of the capacitance Cext of the first capacitor element 621 included in the first capacitance circuit 620-1.

Thus, when the first insulating member IM1 is touched by a finger, i.e., when there is a touch input, a second resonance frequency fres2 of the first oscillation circuit 600-1 may be expressed by Equation 2 below.

$$\text{fres2} \approx 1/\{2\pi \cdot \text{sqrt}(\text{Lind} \cdot [2\text{Cext} \| (2\text{Cext}+\text{CT})])\} \quad (2)$$

where CT ≈ Ccase∥Cfinger∥Cgnd

In Equation 2, ≈ means the same or similar, and means that other values may be further included. In other words, there may be other parameters affecting the first resonant frequency fres1 that may be included in Equation 1.

In Equation 2, Ccase is a case or housing capacitance present between the housing 500 and the first sensor unit SEN1 having the inductance Lind, Cfinger is a human finger capacitance, and Cgnd is a ground capacitance between a circuit ground and earth.

In Equation 2, ∥ indicates that two capacitances are connected in series. For example, a∥b indicates that capacitances "a" and "b" are connected in series, and have an equivalent capacitance equal to (a*b)/(a+b).

When comparing Equation 1 for no touch input and Equation 2 for a touch input, one of the two capacitances 2Cext of the equivalent capacitance of the capacitance Cext of Equation 1 is increased to the capacitance 2Cext+CT of Equation 2. Accordingly, it can be seen that the first resonance frequency fres1 of Equation 1 for no touch input is decreased to the second resonance frequency fres2 of Equation 2 for a touch input.

Accordingly, it can be seen that the total capacitance of the first oscillation circuit of FIG. 5 is changed compared to the total capacitance of the first oscillation circuit 600-1 of FIG. 4.

Referring to FIGS. 4 and 5, the description of the first oscillation circuit 600-1 is also applicable to the second oscillation circuit 600-2, and therefore a description of the second oscillation circuit 600-2 has been omitted.

Figure 6:
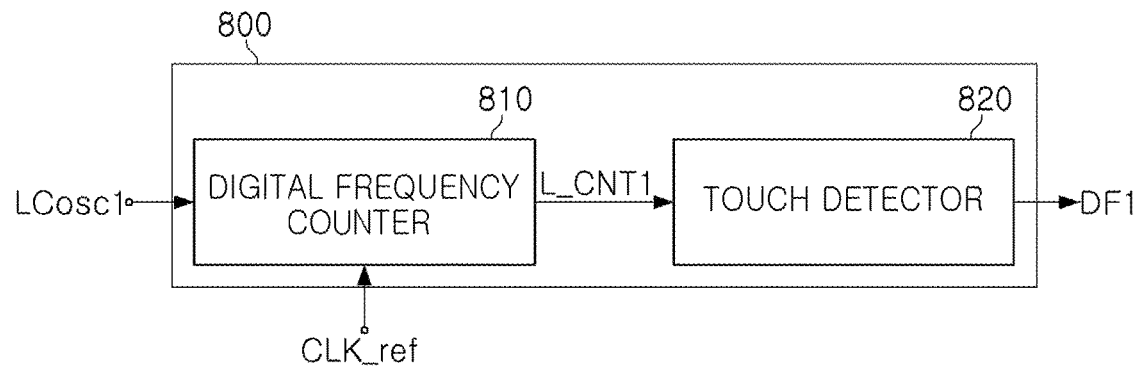
FIG. 6 illustrates an example of a touch detection circuit.

FIG. 6 illustrates an example of a touch detection circuit.

Referring to FIG. 6, the touch detection circuit 800 may include a digital frequency counter 810 and a touch detector 820.

The digital frequency counter 810 may convert the first oscillation signal LCosc1 generated by the first oscillation circuit 600-1 into a first count value L_CNT1 that is a digital value. For example, the digital frequency counter 810 may count the first oscillation signal LOsc1 based on a reference clock signal CLK_ref to obtain the first count value L_CNT1.

When the first oscillation signal LCosc1 is counted based on the reference clock signal CLK_ref, the frequency of the reference clock signal CLK_ref does not need to be very high, so an expensive reference clock generator that generates a reference clock signal CLK_ref having a high frequency is unnecessary. Therefore, the design of the digital frequency counter 810 may be simplified and implementation costs may be reduced.

Then, the touch detector 820 may detect whether there is a touch input based on the first count value L_CNT1 obtained by the digital frequency counter 810, and output a touch detection signal DF1, where DF denotes Detect_Flag.

Figure 7:
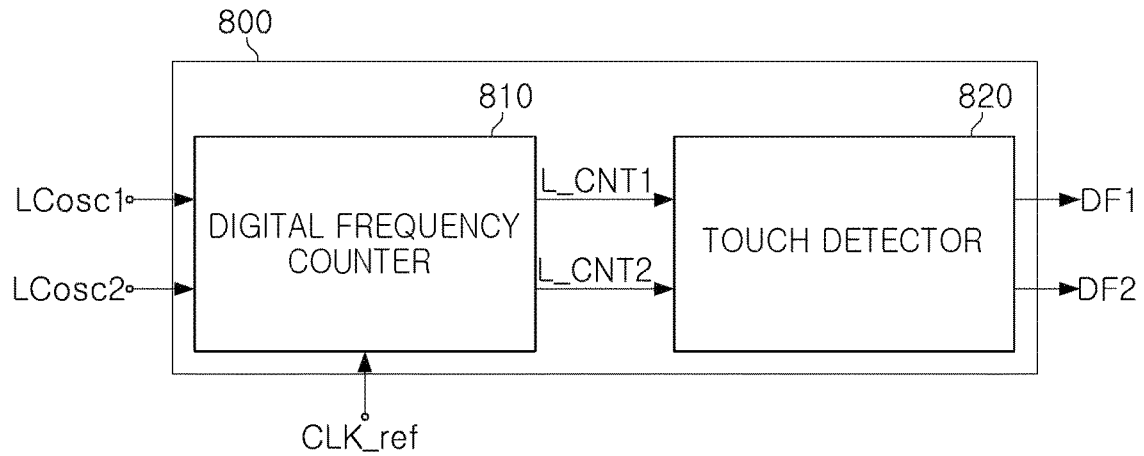
FIG. 7 illustrates another example of a touch detection circuit.

FIG. 7 illustrates another example of a touch detection circuit.

Referring to FIG. 7, the touch detection circuit 800 may include a digital frequency counter 810 and a touch detector 820.

The digital frequency counter 810 may convert the first and second oscillation signals LCosc1 and LCosc2 generated by the first and second oscillation circuits 600-1 and 600-2 into first and second count values L_CNT1 and L_CNT2 that are digital values. For example, the digital frequency counter 810 may count the first oscillation signal LCosc1 based on the reference clock signal CLK_ref to obtain the first count value L_CNT1, and may count the second oscillation signal LCosc2 based on the reference clock signal CLK_ref to obtain a second count value L_CNT2.

When the first oscillation signal LCosc1 and the second oscillation signal LCosc2 are counted based on the reference clock signal CLK_ref, the frequency of the reference clock signal CLK_ref does not need to be very high, so an expensive reference clock generator that generates a reference clock signal CLK_ref having a high frequency is unnecessary. Therefore, the design of the digital frequency counter 810 may be simplified and implementation costs may be reduced.

Then, the touch detector 820 may detect whether touches are input based on the first and second count values L_CNT1 and L_CNT2 obtained by the digital frequency counter 810, and output first and second touch detection signals DF1 and DF2, where DF denotes Detect_Flag.

In the examples illustrated in FIG. 1, the finger is separated from the first or second sensor unit SEN1 or SEN2 by the first or second insulating member IM1 or IM2. The greater the thickness of an insulating material of the first or second insulating member IM1 or IM2 between the finger and the first or second sensor unit SEN1 or SEN2, the lower a sensitivity of the touch sensing device is.

To improve the sensing sensitivity of the touch sensing device, a conductor member may be embedded in each of the first and second insulating members IM1 and IM2 to decrease the thickness of the insulating material between the finger and the first or second sensor SEN1 or SEN2. The conductor member may be exposed on either one or both of the external surface and the internal surface of the first or second insulating member IM1 or IM2.

Examples in which a conductor member is embedded in each of the first and second insulating members IM1 and IM2 will be described with reference to FIGS. 8 to 11.

Figure 8:
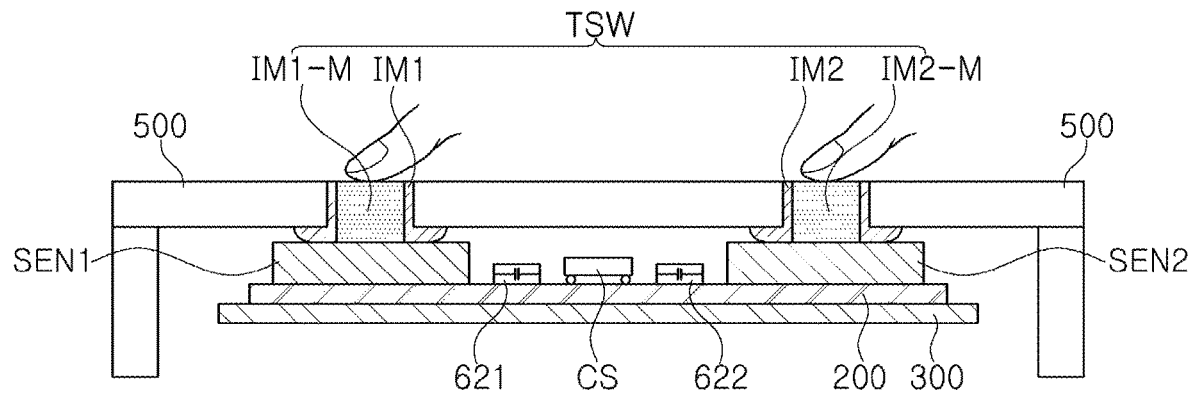
FIG. 8 illustrates an example of a touch manipulation unit.

FIG. 8 illustrates an example of a touch manipulation unit.

Referring to FIG. 8, a first conductor member IM1-M is embedded in the first insulating member IM1 and is exposed on the external and internal surfaces of the first insulating member IM1.

Accordingly, when the first insulating member IM1 is touched by a finger, the first conductor member IM1-M is in contact with the finger on the external surface of the first insulating member IM1, and is in contact with the first sensor unit SEN1 on the internal surface of the first insulating member IM1.

In this example, the first conductor member IM1-M is separated from the housing 500, and when the first insulating member IM1 is touched by a finger, the finger and the first sensor unit SEN1 may be in contact with each through the first conductor member IM1-M, and accordingly the sensitivity may be improved compared to a case in which the first conductor member IM1-M is not embedded in the first insulating member IM1-M.

The above description of the first conductor member IM1-M is also applicable to a second conductor member IM2-M embedded in the second insulating member IM2.

Figure 9:
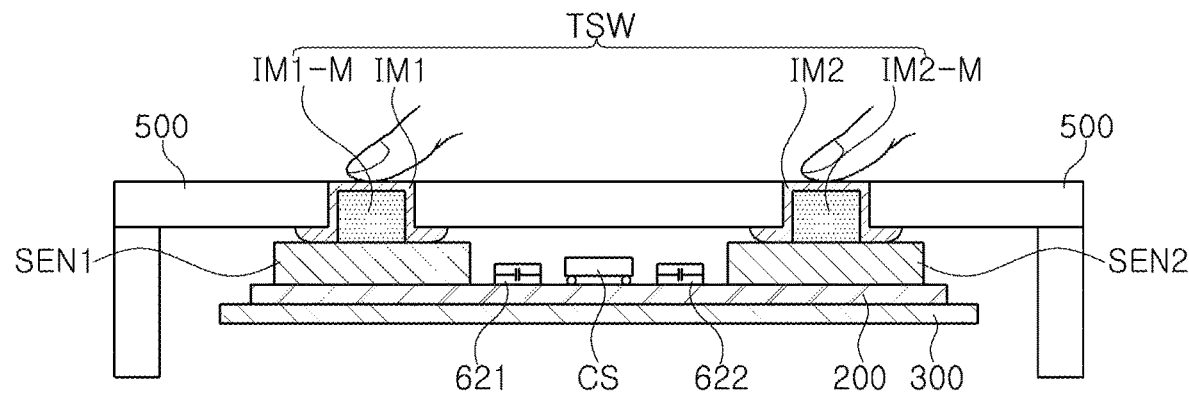
FIG. 9 illustrates another example of a touch manipulation unit.

FIG. 9 illustrates another example of a touch manipulation unit.

Referring to FIG. 9, the first conductor member IM1-M is embedded in the first insulating member IM1 and is not exposed on the external surface of the first insulating member IM1, but is exposed on the internal surface of the first insulating member IM1.

Accordingly, when the first insulating member IM-1 is touched by a finger, the first conductor member IM1-M is not in contact with the finger on the external surface of the first insulating member IM1, but is in contact with the first sensor unit SEN1 on the internal surface of the first insulating member IM1.

In this example, the first conductor member IM1-M is separated from the housing 500, and when the first insulating member IM1 is touched by a finger, a thickness of an insulating material between the finger and the first sensor unit SEN1 when the first conductor member IM1-M is embedded in the first insulating member IM1-M as illustrated in FIG. 9 is less than a thickness of an insulating material between the finger and the first sensor unit SEN1 when the first conductor member IM1-M is not embedded in the first insulating member IM1 as illustrated in FIGS. 2 and 3, thereby improving sensitivity.

The above description of the first conductor member IM1-M is also applicable to the second conductor member IM2-M embedded in the second insulating member IM2.

Figure 10:
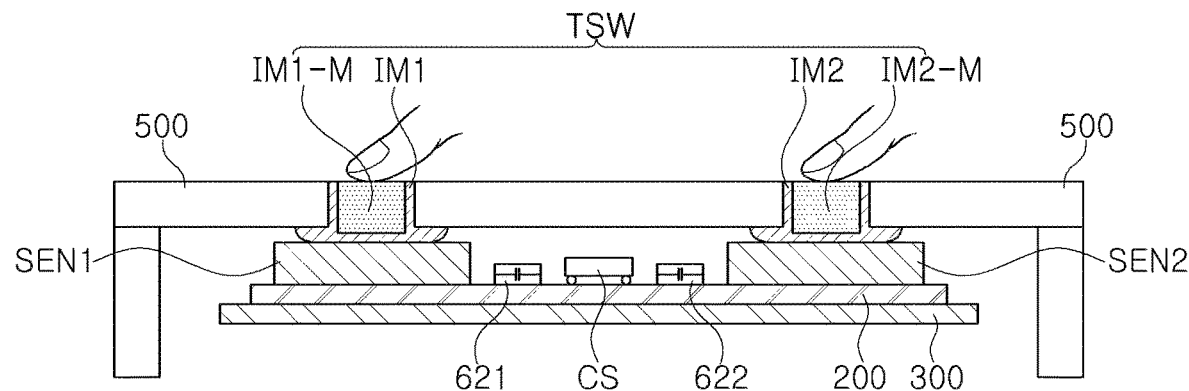
FIG. 10 illustrates another example of a touch manipulation unit.

FIG. 10 illustrates another example of a touch manipulation unit.

Referring to FIG. 10, the first conductor member IM1-M is embedded in the first insulating member IM1 and is exposed on the external surface of the first insulating member IM1, but is not exposed on the internal surface of the first insulating member IM1.

Accordingly, when the first insulating member IM1 is touched by a finger, the first conductor member IM1-M is in contact with the finger on the external surface of the first insulating member IM1, but is not contact with the first sensor unit SEN1 on the internal surface of the first insulating member IM1.

In this example, the first conductor member IM1-M is separated from the housing 500, and when the first insulating member IM1 is touched by a finger, a thickness of an insulating material between the finger and the first sensor unit SEN1 when the first conductor member IM1-M is embedded in the first insulating member IM1-M as illustrated in FIG. 10 is less than a thickness of an insulating material between the finger and the first sensor unit SEN1 when the first conductor member IM1-M is not embedded in the first insulating member IM1 as illustrated in FIGS. 2 and 3, thereby improving sensitivity.

The above description of the first conductor member IM1-M is also applicable to the second conductor member IM2-M embedded in the second insulating member IM2.

Figure 11:
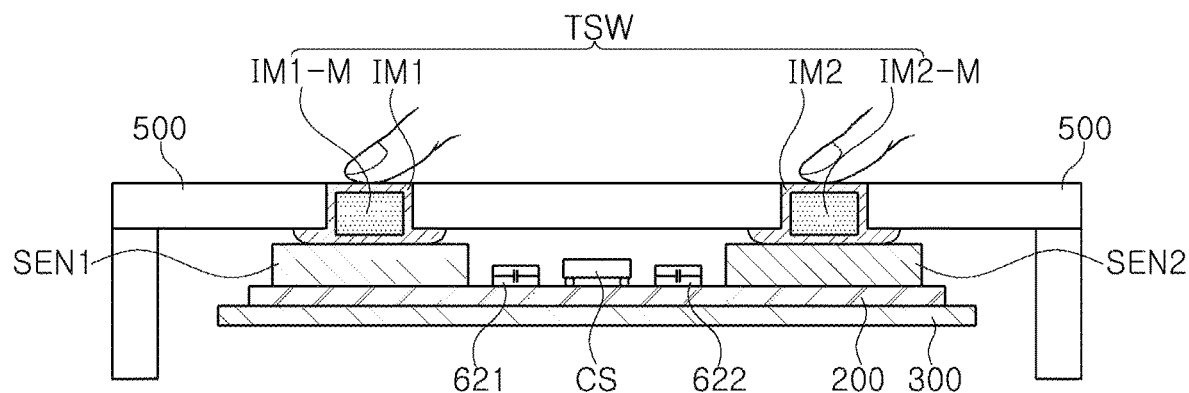
FIG. 11 illustrates another example of a touch manipulation unit.

FIG. 11 illustrates another example of a touch manipulation unit.

Referring to FIG. 11, the first conductor member IM1-M is embedded in the first insulating member IM1 and is not exposed on the external and internal surfaces of the first insulating member IM1.

Accordingly, when the first insulating member IM1 is touched by a finger, the first conductor member IM1-M is not in contact with the finger on the external surface of the first insulating member IM1, and is not in contact with the first sensor unit SEN1 on the internal surface of the first insulating member IM1.

In this example, the first conductor member IM1-M is separated from the housing 500, and when the first insulating member IM1 is touched by a finger, a thickness of an insulating material between the finger and the first sensor unit SEN1 when the first conductor member IM1-M is embedded in the first insulating member IM1-M as illustrated in FIG. 11 is less than a thickness of an insulating material between the finger and the first sensor unit SEN1 when the first conductor member IM1-M is not embedded in the first insulating member IM1 as illustrated in FIGS. 2 and 3, thereby improving sensitivity.

The above description of the first conductor member IM1-M is also applicable to the second conductor member IM2-M embedded in the second insulating member IM2.

Figure 12:
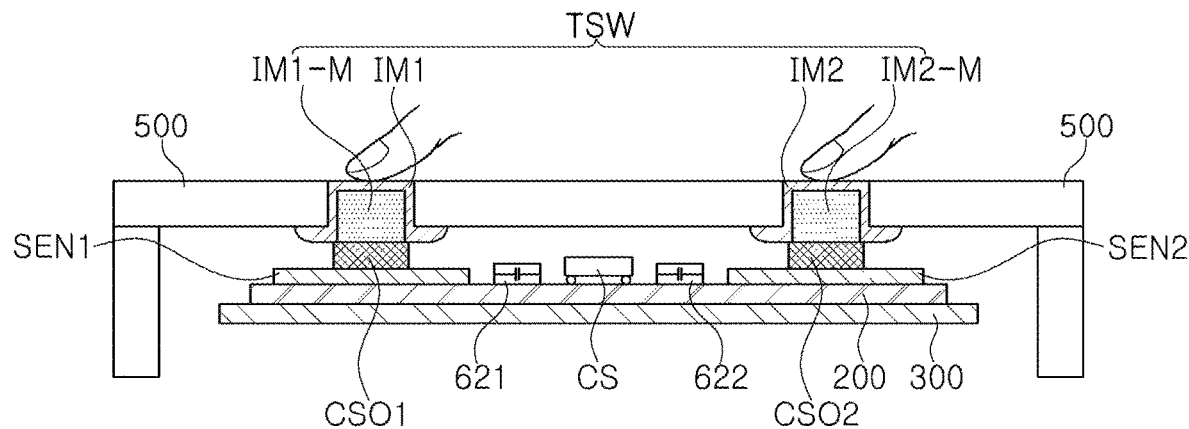
FIG. 12 illustrates an example of sponges of a touch sensing device.

FIG. 12 illustrates an example of sponges of a touch sensing device.

Referring to FIG. 12, the touch sensing device may include a first conductive sponge CSO1 disposed between the first insulating member IM1 and the first sensor unit SEN1. In this case, there is an advantage that the first conductive sponge CSO1 may absorb or tolerate a manufacturing tolerance.

Referring to FIG. 12, the conductor member IM1-M is illustrated as having the structure of FIG. 9, but is not limited thereto. For example, in a case in which the first insulating member IM1 of FIG. 12 includes the conductor member IM1-M therein, the conductor member IM1-M may have the structure of any one of FIGS. 8 to 11.

In addition, referring to FIG. 12, the touch sensing device may include a second conductive sponge CSO2 disposed between the second insulating member IM2 and the second sensor unit SEN2. In this case, there is an advantage that the second conductive sponge CSO2 may absorb or tolerate a manufacturing tolerance.

For example, the sponges CSO1 and CSO2 may be conductive sponges, and when such conductive sponges are used, a sensing sensitivity may be further improved.

Figure 13:
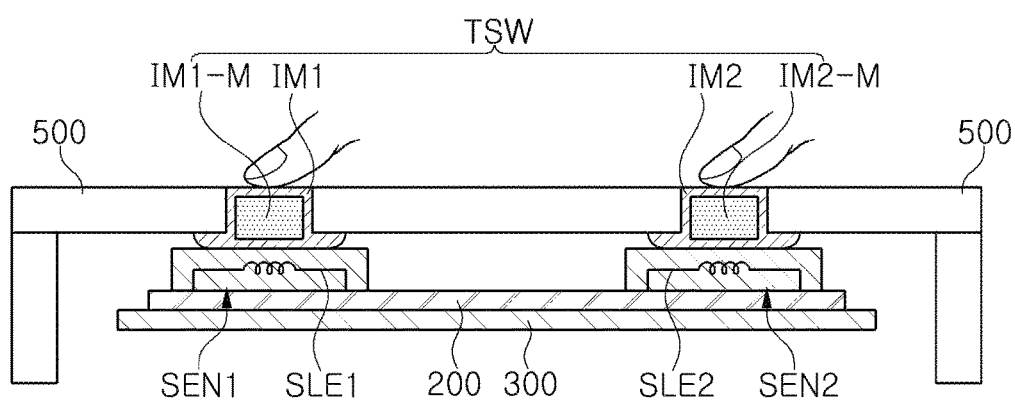
FIG. 13 illustrates an example of sensor units of a touch sensing device.

FIG. 13 illustrates an example of sensor units of a touch sensing device.

Referring to FIG. 13, the first sensor unit SEN1 may contact the internal surface of the first insulating member IM1 and may include a first sensing inductor element SLE1 connected to the oscillation circuit 600 in FIG. 3.

In addition, the second sensor unit SEN2 may contact the internal surface of the second insulating member IM2 and may include a second sensing inductor element SLE2 connected to the oscillation circuit 600 in FIG. 3.

Figure 14:
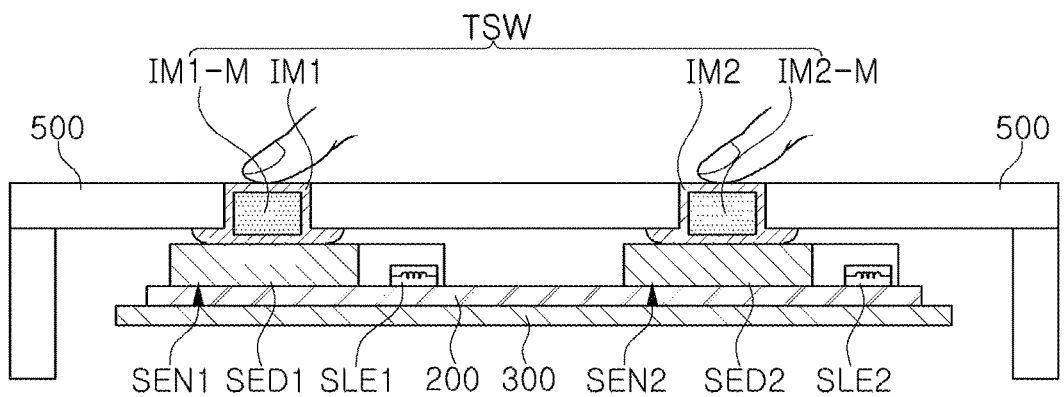
FIG. 14 illustrates another example of sensor units of a touch sensing device.

FIG. 14 illustrates another example of sensor units of a touch sensing device.

Referring to FIG. 14, the first sensor unit SEN1 may include a first sensing electrode SED1 contacting an internal surface of the first insulating member IM1, and a first sensing inductor element SLE1 connected to the first sensing electrode SED1 and the oscillation circuit 600 in FIG. 3.

In addition, the second sensor unit SEN2 may include a second sensing electrode SED2 contacting the internal surface of the second insulating member IM2, and a second sensing inductor element SLE2 connected to the second sensing electrode SED2 and the oscillation circuit 600 in FIG. 3.

As described above, the sensing electrode of a corresponding sensor unit is disposed inside the housing, so when a human finger touches the touch position of a corresponding insulating member, the sensing electrode may be affected by the touch, thereby enabling the touch sending device to sense the touch. Since each sensing electrode contacts the internal surface of a corresponding insulating member and thus operates individually, the touch positions may be individually detected, thereby enabling multiple touches to be detected.

Thus, referring to FIGS. 13 and 14, a sensing electrode or a sensing inductor element may be disposed at a position where a corresponding sensor unit contacts the internal surface of a corresponding insulating member.

Figure 15:
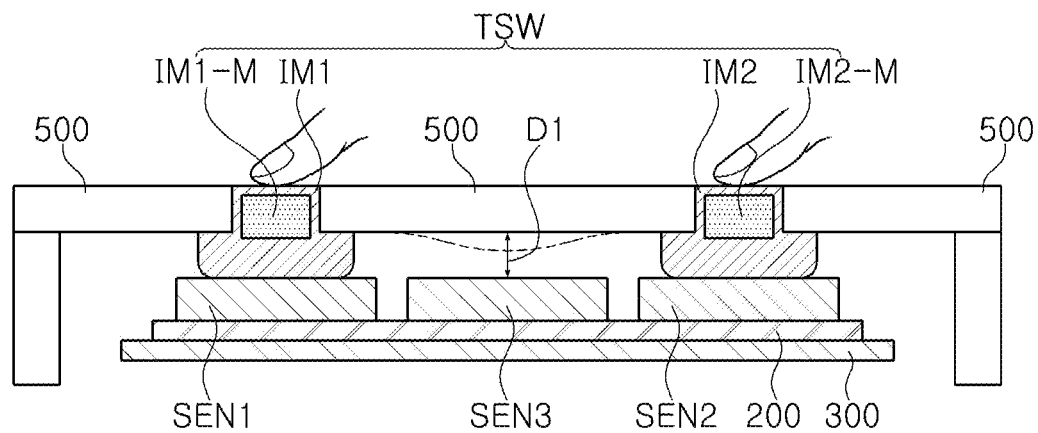
FIG. 15 illustrates another example of sensor units of a touch sensing device.

FIG. 15 illustrates another example of sensor units of a touch sensing device.

Referring to FIG. 15, the touch sensing device may further include a third sensor unit SEN3 spaced apart from the internal surface of the housing 500. As illustrated in FIG. 15, the third sensor unit SEN3 may be mounted on the substrate 200, while being spaced apart from the internal surface of the housing 500 by a predetermined distance D1 when the housing is not pressed by a finger. The third sensor unit SEN3 may include a sensing coil, and when a finger presses on a portion of the housing facing the third sensor unit SEN3, the distance between the internal surface of the housing and the third sensor unit SEN3 changes, thereby changing an inductance of the sensing coil of the third sensor unit SEN3 and the resonance frequency of an oscillation circuit like the first and second oscillation circuits 600-1 and 600-2 in FIG. 3. Accordingly, inductive sensing in which the resonance frequency of the oscillation circuit varies based on the change in the distance between the internal surface of the housing and the third sensor unit SEN3 may be performed.

Although the third sensor unit SEN3 is disposed between the first sensor unit SEN1 and the second sensor unit SEN2 in FIG. 15, this is merely an example, and the third sensor unit SEN3 may be disposed at other locations instead.

In a touch sensing device having the sensing structure of FIG. 15, when the touch manipulation unit is pressed by a human finger, both touch sensing (capacitive sensing) and force sensing (inductive sensing) may operate simultaneously, and when the touch manipulation unit is pressed by something other than a human finger, only the force sensing (inductive sensing) may operate. This difference in operation makes it possible to distinguish whether or not it is a human finger has pressed the touch manipulation unit to prevent malfunctions.

Figure 16:
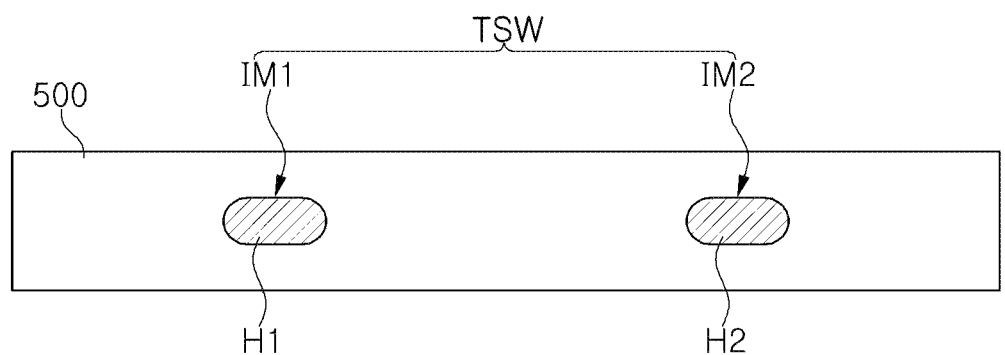
FIG. 16 illustrates an example of insulating members of a touch manipulation unit.
Figure 17:
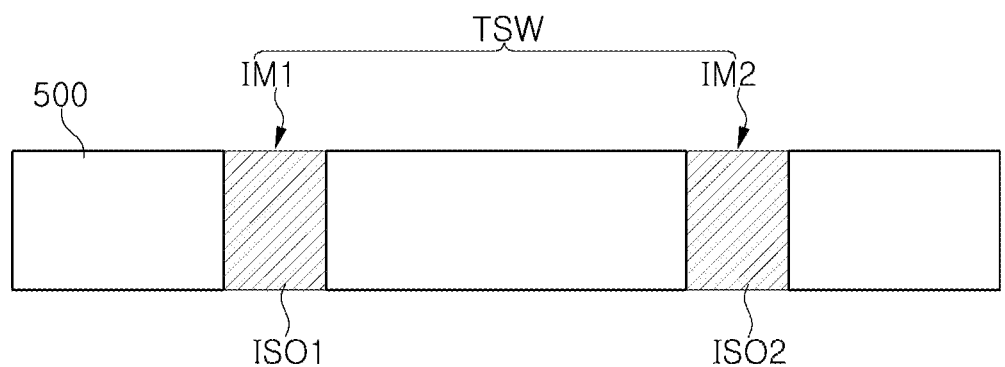
FIG. 17 illustrates another example of insulating members of a touch manipulation unit.

FIG. 16 illustrates an example of insulating members of a touch manipulation unit, and FIG. 17 illustrates another example of insulating members of a touch manipulation unit.

Referring to FIG. 16, the housing has holes H1 and H2 through which the first and second insulating members IM1 and IM2 penetrate. The shapes of the first and second insulating members IM1 and IM2 in FIG. 16 are merely examples, and the first and second insulating members IM1 and IM2 may have various other shapes.

For example, the first and second insulating members IM1 and IM2 may be formed by filling the holes H1 and H2 in the housing 500 with an insulating material. A conductor member that is a metallic body may be embedded in each of the first and second insulating members IM1 and IM2 in any of the various ways illustrated in FIGS. 8 to 11.

Referring to FIG. 17, the first and second insulating members IM1 and IM2 are first and second insulator structures ISO1 and ISO2 that divide an external surface of the housing 500 into sections. A conductor member that is a metallic body may be embedded in each of the first and second insulator structures ISO1 and ISO2 in any of the various ways illustrated in FIGS. 8 to 11. The external shapes of the insulator structures ISO1 and ISO2 constituting the first and second insulating members IM1 and IM2 are not limited to the shapes illustrated in FIG. 17, but may have various other shapes.

As illustrated in FIGS. 16 and 17, when the first and second insulating members IM1 and IM2 are electrically insulated from the conductive housing 500, individual touch areas may be distinguished from one other.

In the examples described above, physical buttons or switches in an electronic device are replaced by a plurality of touch sensing structures each including an insulating member, which makes it possible to distinguish individual touch areas from one another. This makes the design of the electronic device simpler and reduces manufacturing costs, eliminates wear or failure of the physical buttons or switches, and provides dust and water resistance because there are no physical gaps between physical buttons or switches and a housing of the electronic device.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A touch sensing device in an electronic device, the electronic device comprising a touch manipulation unit disposed in a housing of the electronic device, the touch manipulation unit comprising a first insulating member, the touch sensing device comprising:
   a first sensor unit disposed in an internal space of the housing and on an internal surface of the first insulating member; and
   an oscillation circuit connected to the first sensor unit, the oscillation circuit being configured to generate a first oscillation signal having a first resonance frequency that varies in response to a touch capacitance generated in response to the first insulating member being touched,
   wherein the internal surface of the first insulating member is exposed to an internal surface of the housing,
   wherein the first sensor unit contacts the internal surface of the first insulating member, and does not contact the housing, and
   wherein the first insulating member comprises a first portion penetrating through the housing and a second portion extending in a direction perpendicular to the first portion between an internal surface of the housing and the first sensor unit.

2. The touch sensing device of claim 1, further comprising a touch detection circuit configured to detect a touch of the first insulating member based on the first oscillation signal generated by the oscillation circuit.

3. The touch sensing device of claim 1, wherein the first sensor unit is separated from the internal surface of the housing by the second portion of the first insulating member.

4. The touch sensing device of claim 1, wherein the first sensor unit comprises a first sensing inductor element connected to the first oscillation circuit.

5. An electronic device comprising:
   a housing;
   a touch manipulation unit disposed in the housing and comprising a first insulating member;
   a first sensor unit disposed in an internal space of the housing and on an internal surface of the first insulating member;
   an oscillation circuit connected to the first sensor unit, the oscillation circuit being configured to generate a first oscillation signal having a first resonance frequency that varies in response to a touch capacitance generated in response to the first insulating member being touched; and
   a touch detection circuit configured to detect a touch of the first insulating member based on the first oscillation signal generated by the oscillation circuit,
   wherein the internal surface of the first insulating member is exposed to an internal surface of the housing;
   wherein the first sensor unit contacts the internal surface of the first insulating member, and does not contact the housing, and
   wherein the first insulating member comprises a first portion penetrating through the housing and a second portion extending in a direction perpendicular to the first portion between an internal surface of the housing and the first sensor unit.

6. The electronic device of claim 5, wherein
the first sensor unit is separated from the internal surface of the housing by the second portion of the first insulating member.

7. The electronic device of claim 5, wherein the touch manipulation unit further comprises a second insulating member penetrating through the housing, and
the electronic device further comprises a second sensor unit disposed on an internal surface of the second insulating member.

8. A touch sensing device in an electronic device, the electronic device comprising a housing, and a first touch member penetrating through the housing and being made of a material different from a material of which the housing is made, the touch sensing device comprising:
a first sensor unit disposed in an internal space of the housing, contacting an internal surface of the first touch member, and being separated from the housing; and
a first oscillation circuit connected to the first sensor unit and configured to generate a first oscillation signal having a first resonance frequency that changes in response to the first touch member being touched,
wherein the internal surface of the first touch member is exposed to an internal surface of the housing, and
wherein the first touch member comprises a first portion penetrating through the housing and a second portion extending in a direction perpendicular to the first portion between an internal surface of the housing and the first sensor unit.

9. The touch sensing device of claim 8, wherein the housing is made of a conductive material,
the first touch member is made of an insulating material, and
the first touch member separates the first sensor unit from the housing.

10. The touch sensing device of claim 8, wherein the electronic device further comprises a second touch member penetrating through the housing and being made of a material different from the material of which the housing is made, and
the touch sensing device further comprises:
a second sensor unit contacting an internal surface of the second touch member and being separated from the housing; and
a second oscillation circuit connected to the second sensor unit and configured to generate a second oscillation signal having a second resonance frequency that changes in response to the second touch member being touched.

11. An electronic device comprising:
a housing;
a first touch member penetrating through the housing and being made of a material different from a material of which the housing is made;
a first sensor unit disposed in an internal space of the housing, contacting an internal surface of the first touch member, and being separated from the housing;
a first oscillation circuit connected to the first sensor unit and configured to generate a first oscillation signal having a first resonance frequency that changes in response to the first touch member being touched; and
a touch detection circuit configured to detect whether the first touch member has been touched based on the first oscillation signal,
wherein the internal surface of the first touch member is exposed to an internal surface of the housing, and
wherein the first touch member comprises a first portion penetrating through the housing and a second portion extending in a direction perpendicular to the first portion between an internal surface of the housing and the first sensor unit.

12. The electronic device of claim 11, wherein the housing is made of a conductive material,
the first touch member is made of an insulating material, and
the first touch member separates the first sensor unit from the housing.

13. The electronic device of claim 11, wherein the first touch member comprises a first conductor member embedded in the first touch member so that the first conductor member is separated from the housing by the touch member, and is either not exposed on an external surface of the first touch member and an internal surface of the first touch member, or is exposed on either one or both of the external surface of the touch member and the internal surface of the touch member.

14. The electronic device of claim 11, further comprising:
a second touch member penetrating through the housing and being made of a material different from the material of which the housing is made;
a second sensor unit contacting an internal surface of the second touch member and being separated from the housing; and
a second oscillation circuit connected to the second sensor unit and configured to generate a second oscillation signal having a second resonance frequency that changes in response to the second touch member being touched,
wherein the touch detection circuit is further configured to detect whether the second touch member has been touched based on the second oscillation signal.

* * * * *